(12) United States Patent
Krishnamurthy et al.

(10) Patent No.: US 10,845,800 B2
(45) Date of Patent: Nov. 24, 2020

(54) VEHICLE SOFTWARE CHECK

(71) Applicant: Ford Global Technologies, LLC, Dearborn, MI (US)

(72) Inventors: Vivekananda Krishnamurthy, Belleville, MI (US); Amy Beth Cronin, Westfield, IN (US); Scott J. Lauffer, Northville, MI (US); Barnabas J. Nemec, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 16/154,405

(22) Filed: Oct. 8, 2018

(65) Prior Publication Data
US 2020/0110406 A1 Apr. 9, 2020

(51) Int. Cl.
| G05D 1/00 | (2006.01) |
| G07C 5/08 | (2006.01) |
| G06F 8/65 | (2018.01) |
| B60W 50/04 | (2006.01) |

(52) U.S. Cl.
CPC ......... *G05D 1/0061* (2013.01); *B60W 50/045* (2013.01); *G05D 1/0088* (2013.01); *G06F 8/65* (2013.01); *G07C 5/0808* (2013.01); *G05D 2201/0213* (2013.01)

(58) Field of Classification Search
CPC . G05D 1/0061; G05D 1/0088; B60W 50/045; G06F 8/65; G07C 5/0808
See application file for complete search history.

(56) References Cited

U.S. PATENT DOCUMENTS

| 5,513,107 | A | 4/1996 | Gormley |
| 6,430,481 | B1 | 8/2002 | Lovelace, II et al. |
| 8,392,764 | B2 | 3/2013 | de Buen |
| 8,412,406 | B2 | 4/2013 | Johnson et al. |
| 9,639,344 | B2 | 5/2017 | Rockwell et al. |
| 2005/0262337 | A1 | 11/2005 | Ziesmer et al. |
| 2016/0344705 | A1 | 11/2016 | Stumpf et al. |
| 2019/0092341 | A1* | 3/2019 | Stark ..................... B60W 10/18 |

* cited by examiner

*Primary Examiner* — Michael D Lang
(74) *Attorney, Agent, or Firm* — Frank A. MacKenzie; Bejin Bieneman PLC

(57) ABSTRACT

A computer includes a processor and a memory storing instructions executable by the processor to, upon determining that a local set of identifiers is inconsistent with a remotely served set of identifiers, prevent a vehicle from entering an autonomous mode or instruct the vehicle to perform a minimal risk condition.

20 Claims, 6 Drawing Sheets

VEHICLE SOFTWARE CHECK

BACKGROUND

Modern automobiles, especially vehicles capable of autonomous operation, typically include a plurality of electronic control units or modules (ECU). The ECUs are computers. A vehicle's computing tasks can be divided among the ECUs by function; a hybrid-powertrain control module can control a hybrid powertrain of the vehicle, a restraint control module can control airbags and pretensioners, and so on.

DETAILED DESCRIPTION

Figure 1:
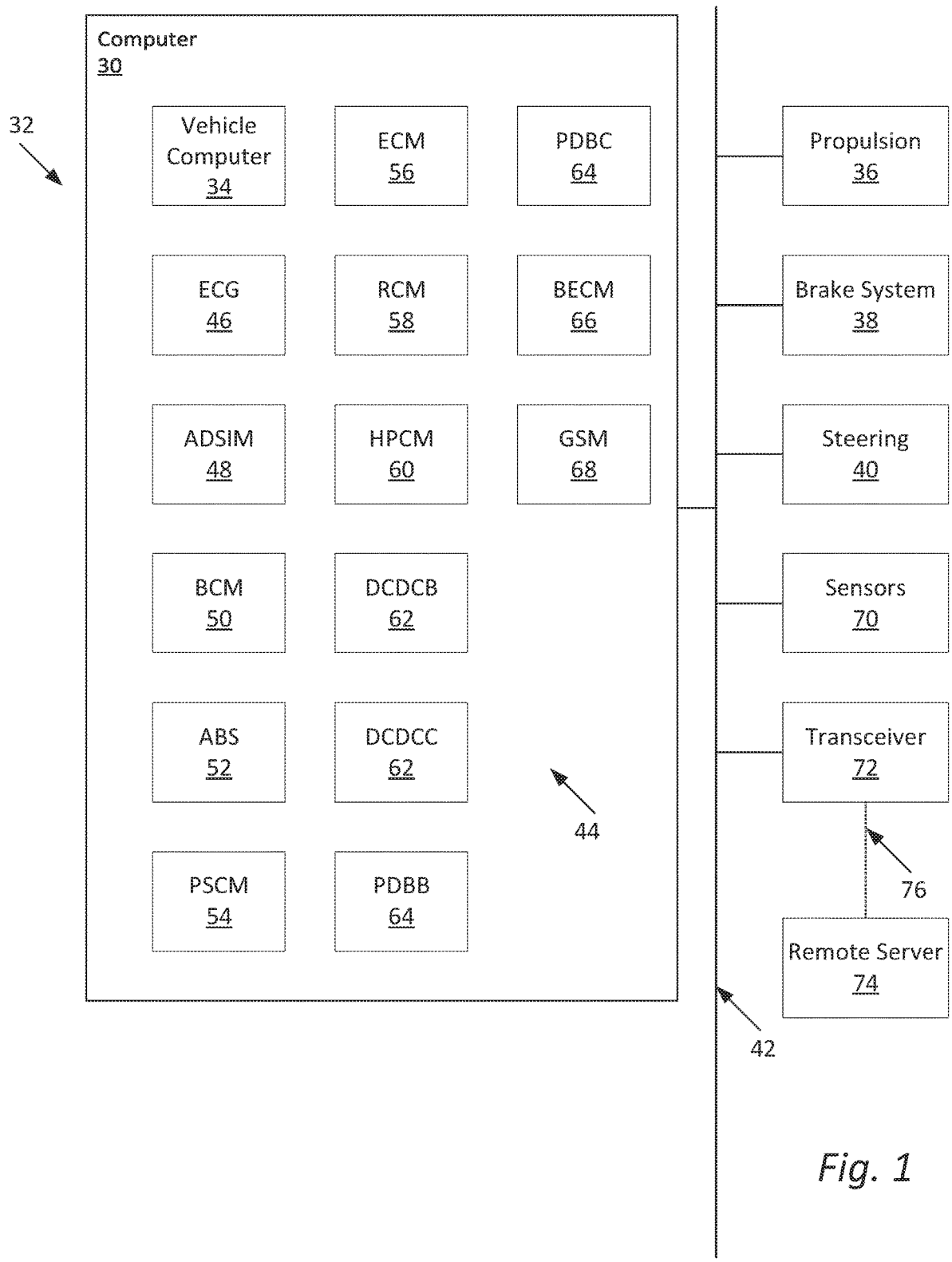
FIG. 1 is a block diagram of an example vehicle.

The system described below improves the operation of a vehicle by controlling operation of software and hardware. When inconsistencies occur, the vehicle can react by taking safety precautions appropriate for the vehicle context. The system can allow a fleet operator greater control over a fleet of vehicles. The system can improve vehicle efficiency and safety, and can ensure timely and correct maintenance for the vehicle by identifying hardware and by keeping software up to date and detecting a misinstallation.

A computer includes a processor and a memory storing instructions executable by the processor to, upon determining that a local set of identifiers is inconsistent with a remotely served set of identifiers, prevent a vehicle from entering an autonomous mode or instruct the vehicle to perform a minimal risk condition.

The instructions may further include to, upon determining that the local set of identifiers is inconsistent with the remotely served set of identifiers, receive a software update from a remote server. The instructions may further include to, upon receiving the software update, set a consistency status from a faulty status to an acceptable status, and set a diagnostic trouble code in response to the consistency status switching from the faulty status to the acceptable status in less than a time threshold.

The identifiers may include configuration identifiers.

The instructions may further include to periodically request the identifiers from vehicle components, and store the returned identifiers in the local set of identifiers.

The local set of identifiers may be a current local set of identifiers, and the instructions may further include to, upon determining that the current local set of identifiers is inconsistent with a previous local set of identifiers, transmit the current local set of identifiers to a remote server serving the remotely served set of identifiers.

Performing the minimal risk condition may include driving the vehicle to a designated location.

The local set of identifiers may be stored in a memory onboard the vehicle.

The remotely served set of identifiers may be stored in a memory remote from the vehicle.

The instructions may further include to determine that the local set of identifiers is inconsistent with the remotely served set of identifiers by determining that at least one identifier in the local set of identifiers is different than a respective identifier in the remotely served set of identifiers.

A method includes, upon determining that a local set of identifiers is inconsistent with a remotely served set of identifiers, preventing a vehicle from entering an autonomous mode, or instructing the vehicle to perform a minimal risk condition.

The method may further include, upon determining that the local set of identifiers is inconsistent with the remotely served set of identifiers, receiving a software update from a remote server. The method may further include, upon receiving the software update, setting a consistency status from a faulty status to an acceptable status, and setting a diagnostic trouble code in response to the consistency status switching from the faulty status to the acceptable status in less than a time threshold.

The identifiers may include configuration identifiers.

The method may further include periodically requesting the identifiers from vehicle components, and storing the returned identifiers in the local set of identifiers.

The local set of identifiers may be a current local set of identifiers, and the method may further include, upon determining that the current local set of identifiers is inconsistent with a previous local set of identifiers, transmitting the current local set of identifiers to a remote server serving the remotely served set of identifiers.

Performing the minimal risk condition may include driving the vehicle to a designated location.

The local set of identifiers is stored in a memory onboard the vehicle.

The remotely served set of identifiers may be stored in a memory remote from the vehicle.

The method may further include determining that the local set of identifiers is inconsistent with the remotely served set of identifiers by determining that at least one identifier in the local set of identifiers is different than a respective identifier in the remotely served set of identifiers.

With reference to the Figures, a computer 30 includes a processor and a memory storing instructions executable by the processor to, upon determining that a local set of identifiers is inconsistent with a remotely served set of identifiers, prevent a vehicle 32 from entering an autonomous mode and/or instruct the vehicle 32 to perform a minimal risk condition, as defined below.

With reference to FIG. 1, the vehicle 32 may be any passenger or commercial automobile such as a car, a truck, a sport utility vehicle, a crossover, a van, a minivan, a taxi, a bus, etc.

The vehicle 32 may be an autonomous vehicle. A vehicle computer 34 can be programmed to operate the vehicle 32 independently of the intervention of a human driver, completely or to a lesser degree. The vehicle computer 34 may be programmed to operate the propulsion 36, brake system 38, steering 40, and/or other vehicle systems. The vehicle computer 34 may be able to switch between differing modes of autonomy, e.g., one or more autonomous modes and a nonautonomous mode. For the purposes of this disclosure, autonomous operation means the vehicle computer 34 controls the propulsion 36, brake system 38, and steering 40 without input from a human driver; semi-autonomous operation means the vehicle computer 34 controls one or two of the propulsion 36, brake system 38, and steering 40 and a human driver controls the remainder; and nonautonomous operation means a human driver controls the propulsion 36, brake system 38, and steering 40. An autonomous mode means that the vehicle computer 34 provides autonomous or semi-autonomous operation. A nonautonomous mode means the vehicle computer 34 provides nonautonomous operation.

The computer 30 is one or more microprocessor-based computers. The computer 30 includes a memory, at least one processor, etc. The memory of the computer 30 includes media for storing instructions executable by the processor as well as for electronically storing data and/or databases. The computer 30 may be the same computer as the vehicle computer 34, or the computer 30 may be one or more separate computers in communication with the vehicle computer 34 via a communications network 42, or the computer 30 may encompass multiple computers including the vehicle computer 34. As a separate computer, the computer 30 may be or include, e.g., one or more electronic control units or modules (ECU) 44 such as an enhanced central gateway (ECG) 46 and/or an automated-driving-system interface module (ADSIM) 48.

The vehicle computer 34 is a microprocessor-based computer. The vehicle computer 34 includes a processor, a memory, etc. The memory of the vehicle computer 34 includes media for storing instructions executable by the processor as well as for electronically storing data and/or databases.

The ECUs 44 are microprocessor-based computers. The ECUs 44 each include a processor, memory, etc. The memory of each ECU 44 includes media for storing instructions executable by the respective processor as well as for electronically storing data and/or databases. The ECG 46 schedules and performs communications between the ECUs 44. The ADSIM 48 handles nondriving tasks related to autonomous operation. Other ECUs 44 may include a body control module 50, an antilock brake control module 52, a power-steering control module 54, an engine control module 56, a restraint control module 58, a hybrid-powertrain control module 60, DC/DC converters 62, power-distribution boxes 64, a battery-electronics control module 66, and a gear-shift module 68.

The computer 30 may transmit and receive data through the communications network 42 such as a controller area network (CAN) bus, Ethernet, WiFi, Local Interconnect Network (LIN), onboard diagnostics connector (OBD-II), and/or by any other wired or wireless communications network. The computer 30 may be communicatively coupled to the vehicle computer 34, the propulsion 36, the brake system 38, the steering 40, the ECUs 44, sensors 70, a transceiver 72, and other components via the communications network 42.

The propulsion 36 of the vehicle 32 generates energy and translates the energy into motion of the vehicle 32. The propulsion 36 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 36 can include an electronic control unit (ECU) or the like that is in communication with and receives input from the vehicle computer 34 and/or a human driver, e.g., the hybrid-powertrain control module 60. The human driver may control the propulsion 36 via, e.g., an accelerator pedal and/or a gear-shift lever.

The brake system 38 is typically a conventional vehicle braking subsystem and resists the motion of the vehicle 32 to thereby slow and/or stop the vehicle 32. The brake system 38 may include friction brakes such as disc brakes, drum brakes, band brakes, etc.; regenerative brakes; any other suitable type of brakes; or a combination. The brake system 38 can include an electronic control unit (ECU) or the like that is in communication with and receives input from the vehicle computer 34 and/or a human driver, e.g., the antilock brake control module 52. The human driver may control the brake system 38 via, e.g., a brake pedal.

The steering 40 is typically a conventional vehicle steering subsystem and controls the turning of the wheels. The steering 40 may be a rack-and-pinion system with electric power-assisted steering, a steer-by-wire system, as both are known, or any other suitable system. The steering 40 can include an electronic control unit (ECU) or the like that is in communication with and receives input from the vehicle computer 34 and/or a human driver, e.g., the power-steering control module 54. The human driver may control the steering 40 via, e.g., a steering wheel.

The sensors 70 may provide data about operation of the vehicle 32, for example, wheel speed, wheel orientation, and engine and transmission data (e.g., temperature, fuel consumption, etc.). The sensors 70 may detect the location and/or orientation of the vehicle 32. For example, the sensors 70 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 70 may detect the external world, e.g., objects and/or characteristics of surroundings of the vehicle 32, such as other vehicles, road lane markings, traffic lights and/or signs, pedestrians, etc. For example, the sensors 70 may include radar sensors, scanning laser range finders, light detection and ranging (LIDAR) devices, and image processing sensors such as cameras.

The transceiver 72 may be adapted to transmit signals wirelessly through any suitable wireless communication protocol, such as Bluetooth®, WiFi, IEEE 802.11a/b/g, other RF (radio frequency) communications, etc. The transceiver 72 may be one device or may include a separate transmitter and receiver. The transceiver 72 may be adapted to communicate with a remote server 74, that is, a server distinct and spaced from the vehicle 32, through a network 76.

The remote server 74 is located outside the vehicle 32. For example, the remote server 74 may be included in other vehicles (e.g., V2V communications), infrastructure components (e.g., V2I communications via Dedicated Short-Range Communications (DSRC) or the like), emergency responders, mobile devices associated with the owner of the vehicle 32, etc. The remote server 74 may include a server and a data store.

The transceiver 72 can connect to the remote server 74 through the network 76. The network 76 represents one or more mechanisms by which the computer 30 may communicate with the remote server 74. Accordingly, the network 76 may be one or more of various wired or wireless communication mechanisms, including any desired combination of wired (e.g., cable and fiber) and/or wireless (e.g., cellular, wireless, satellite, microwave, and radio frequency)

communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

Some components of the vehicle 32 have identifiers. In this context, "identifier" is defined as a label or setting substantially unique to a component. An identifier may be a hardware identifier, i.e., a label uniquely identifying a physical component of the vehicle 32; a software identifier, i.e., a label uniquely identifying a piece of software such as a program, application, operating system, etc.; or a configuration identifier, i.e., a specification of one or more settings applicable to a component, e.g., for stability control, antilock braking, etc. A component may have, for example, a hardware identifier, multiple software identifiers, and one or more configuration identifiers. Any component electronically connected to the computer 30, e.g., the ECUs 44, the sensors 70, etc., may store its own identifiers and return those identifiers in response to a query. The computer 30, e.g., the ECG 46, stores identifiers of the components of the vehicle 32 in memory, these being referred to throughout as a local set of identifiers. The remote server 74 stores respective identifiers of the same components in a memory remote from the vehicle 32, referred to throughout as a remotely served set of identifiers. The remotely served set of identifiers may be a "master list," i.e., a curated list of identifiers for the most up-to-date hardware, software, and/or configurations.

Figure 2:
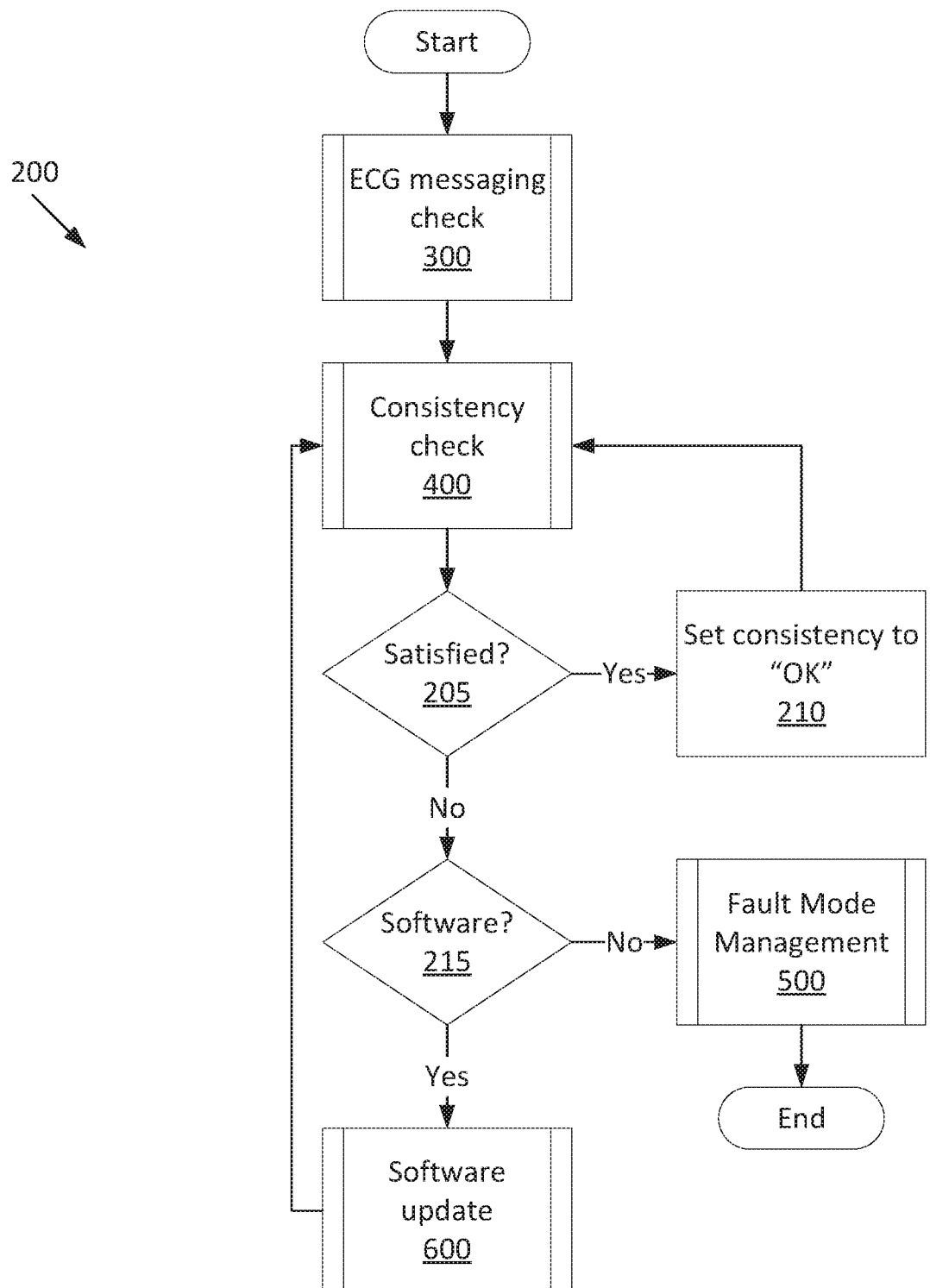
FIG. 2 is a process flow diagram of an example process for managing hardware and software for the vehicle of FIG. 1.

FIG. 2 is a process flow diagram illustrating an exemplary process 200 for managing hardware and software for the vehicle 32. The memory of the computer 30 stores executable instructions for performing the steps of process 200. As the vehicle 32 is maintained and repaired over time, and as the software run by the ECUs is updated over time, errors can occur within the vehicle 32 from having the wrong component installed or an inconsistent version of software installed. As a nonlimiting general overview of the process 200, the computer 30 checks the messaging capabilities of the vehicle 32, and checks the consistency of the local set of identifiers for the hardware and software of the vehicle 32 with the remotely served set of identifiers, as described in more detail below; if consistent, the computer 30 sets a consistency status to "OK" and continues checking; if inconsistent, the computer 30 performs fault-mode management if the inconsistency is for a hardware identifier or configuration identifier, and performs a software update (which may also include the fault-mode management) if the inconsistency is for a software identifier.

The process 200 begins by performing a process 300 for verifying that the communications systems of the vehicle 32 are operational, described in more detail below. If the process 300 results in taking fault-mode-management measures, as described below, the process 200 is interrupted and does not continue.

Next, after the process 300 is successfully completed, the process 200 continues by performing a process 400 for checking the consistency of hardware and software for the vehicle 32, described in more detail below. As a result of performing the process 400, the computer 30 will have received a response from the remote server 74 listing inconsistencies, if any, between the local set of identifiers and the remotely served set of identifiers.

Next, after the process 400 is completed, the process 200 continues in a decision block 205. In the decision block 205, the computer 30 determines whether the local set of identifiers is inconsistent with the remotely served set of identifiers, e.g., by checking the response from the remote server 74 listing inconsistencies. For the purposes of this disclosure, "inconsistent" for two ordered sets is defined as an element of one set being different than the respective element of the other set. The local set of identifiers is "inconsistent" with the remotely served set of identifiers if at least one identifier in the local set of identifiers is different than a respective identifier in the remotely served set of identifiers, e.g., one of the local software identifiers for the body control module 50 is different than the corresponding remotely served software identifier for the body control module 50. Whether identifiers are different may be determined by string matching, e.g., by the remote server 74 when compiling the response listing inconsistencies. If the local set of identifiers is inconsistent with the remotely served set of identifiers, the process 200 proceeds to a decision block 215.

If the local set of identifiers is consistent with the remotely served set of identifiers, next, in a block 210, the computer 30 sets a consistency status to an acceptable status, e.g., "OK," i.e., a setting indicating no problems with the identifiers. The consistency status may be for any identifier, or the consistency status may be specific to the type of identifier, e.g., a hardware-identifier consistency status, a software-identifier consistency status, and a configuration-identifier consistency status. The consistency status may be transmitted to the various ECUs 44, whose programming may take the consistency status into account. After the block 210, the process 200 returns to performing the process 400 to continue periodically checking the consistency of the identifiers.

After the decision block 205, if the local set of identifiers is inconsistent with the remotely served set of identifiers, the process 200 continues with the decision block 215. In the decision block 215, the computer 30 determines whether the inconsistency between the local set of identifiers and the remotely served set of identifiers is for a software identifier, a hardware identifier, or a configuration identifier.

If the inconsistency is for a hardware identifier or for a configuration identifier, the process 200 continues by performing a process 500 for fault-mode management, which is described below. After the process 500 is complete, the process 200 ends.

If the inconsistency is for a software identifier, the process 200 continues by performing a process 600 for updating the software of the vehicle 32 (which may include performing the process 500 for fault-mode management). After the process 600 is complete, the process 200 returns to performing the process 400 to continue periodically checking the consistency of the identifiers.

Figure 3:
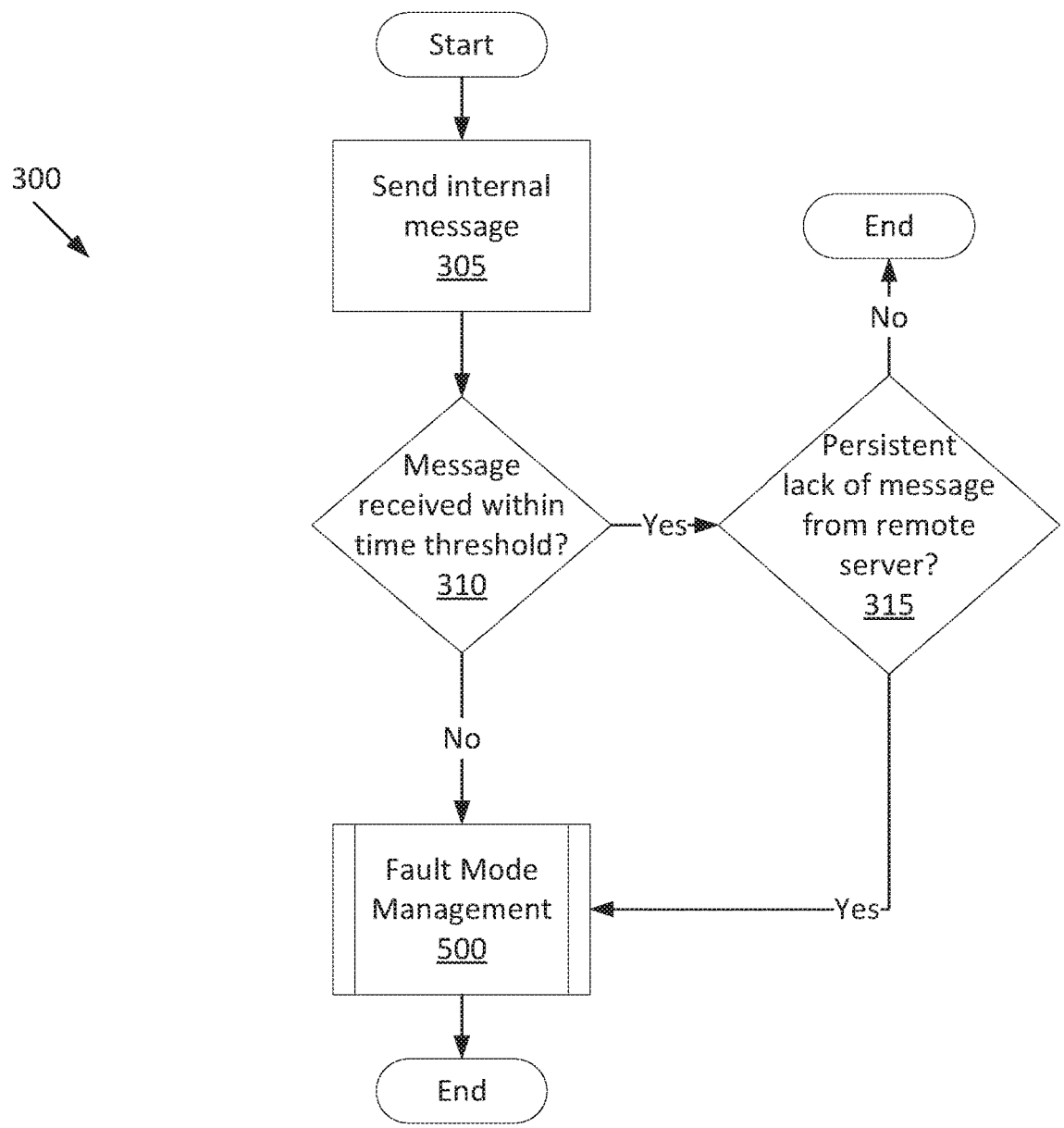
FIG. 3 is a process flow diagram of an example process for verifying the communications system of the vehicle of FIG. 1.

FIG. 3 is a process flow diagram of the process 300 for verifying that the communications systems of the vehicle 32 are operational. The memory of the computer 30, e.g., of the ADSIM 48, stores executable instructions for performing the steps of the process 300. As a general overview of the process 300, the computer 30 checks whether an internal message is received within a time threshold and whether the remote server 74 can be contacted; if either fails, the computer 30 performs fault-mode management.

The process 300 begins in a block 305, in which the computer 30 sends an internal message, i.e., a message from one ECU 44 to another ECU 44 in the vehicle 32. For example, the ECG 46 may send a status message to the ADSIM 48.

Next, in a decision block 310, the computer 30 determines whether the internal message was received within a time threshold. The time threshold may be chosen to be just long enough that substantially all internal messages would be delivered absent a malfunction. If the internal message is not received within the time threshold, the process 300 continues by performing the process 500 for fault-mode management.

If the internal message is received within the threshold, next, in a decision block 315, the computer 30 determines whether the remote server 74 can be contacted. The computer 30 may transmit a preset number of messages to the remote server 74 via the transceiver 72 without receiving a response before concluding that the remote server 74 cannot be contacted. The preset number of messages may be chosen so that at least one successful exchange will occur if a signal from the remote server 74 is sufficiently strong for reliable communication. If contact with the remote server 74 is established, the process 300 ends.

The process 300 continues by performing the process 500 if the internal message is not received within the time threshold after the decision block 310 or if contact with the remote server 74 is not established in the decision block 315. After the process 500 is performed, the process 300 ends. If the process 300 was being performed as part of the process 200, then the process 200 is interrupted and does not continue.

Figure 4:
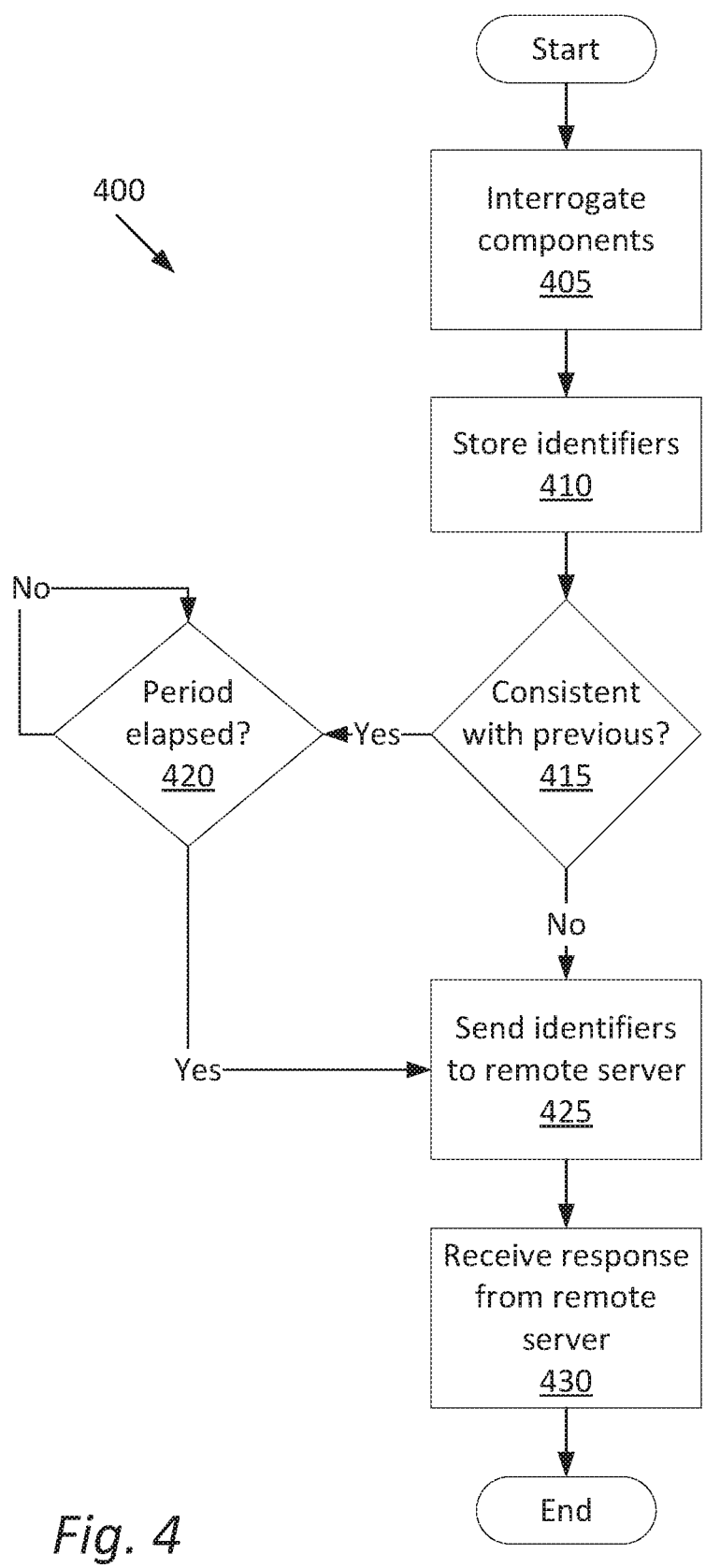
FIG. 4 is a process flow diagram of an example process for checking the consistency of hardware and software for the vehicle of FIG. 1.

FIG. 4 is a process flow diagram of the process 400 for checking the consistency of hardware and software for the vehicle 32. The memory of the computer 30 stores executable instructions for performing the steps of the process 400. The computer 30 may perform the process 400 periodically, e.g., with a preset frequency or upon a trigger such as starting the vehicle 32. As a general overview of the process 400, the computer 30 interrogates components of the vehicle 32 for their identifiers, stores the identifiers, and if the local set of identifiers is inconsistent with a previous local set of identifiers or if a preset time period has elapsed, sends the local set of identifiers to the remote server 74 and receives a response.

The process 400 begins in a block 405, in which the computer 30 requests the identifiers from components of the vehicle 32. The ECG 46 transmits requests through the communications network 42 to the components such as the ECUs 44, which respond with their software identifiers, hardware identifiers, and/or configuration identifiers.

Next, in a block 410, the computer 30 stores the returned identifiers in the local set of identifiers. The local set of identifiers is stored in the memory of the computer 30, i.e., onboard the vehicle 32.

Next, in a decision block 415, the computer 30 determines whether the current local set of identifiers is consistent with a previous local set of identifiers. The previous local set of identifiers was stored in the block 410 during an earlier iteration of the process 400. If no previous local set of identifiers is stored in the memory, then the current local set of identifiers is deemed consistent. If the current local set of identifiers is inconsistent with the previous local set of identifiers, the process 400 proceeds to a block 425.

If the current local set of identifiers is consistent with the previous local set of identifiers, next, in a decision block 420, the computer 30 determines whether a preset period has elapsed. The preset period may be chosen to be long enough that a possibility is introduced that one of the identifiers has changed. If the preset period has not elapsed, the process 400 waits until the preset period does elapse.

If the current local set of identifiers is inconsistent with the previous local set of identifiers in the decision block 415, or once the preset period has elapsed in the decision block 420, the process 400 continues to the block 425. In the block 425, the computer 30 transmits the current local set of identifiers to the remote server 74 via the transceiver 72.

Next, in a block 430, the computer 30 receives a response from the remote server 74. The response from the remote server 74 lists inconsistencies, if any, between the local set of identifiers and the remotely served set of identifiers. Because the remotely served set of identifiers on the remote server 74 can be a "master list" of the most up-to-date identifiers, the response listing inconsistencies effectively tells the computer 30 which hardware, software, and configurations are out of date. After the block 430, the process 400 ends.

Figure 5:
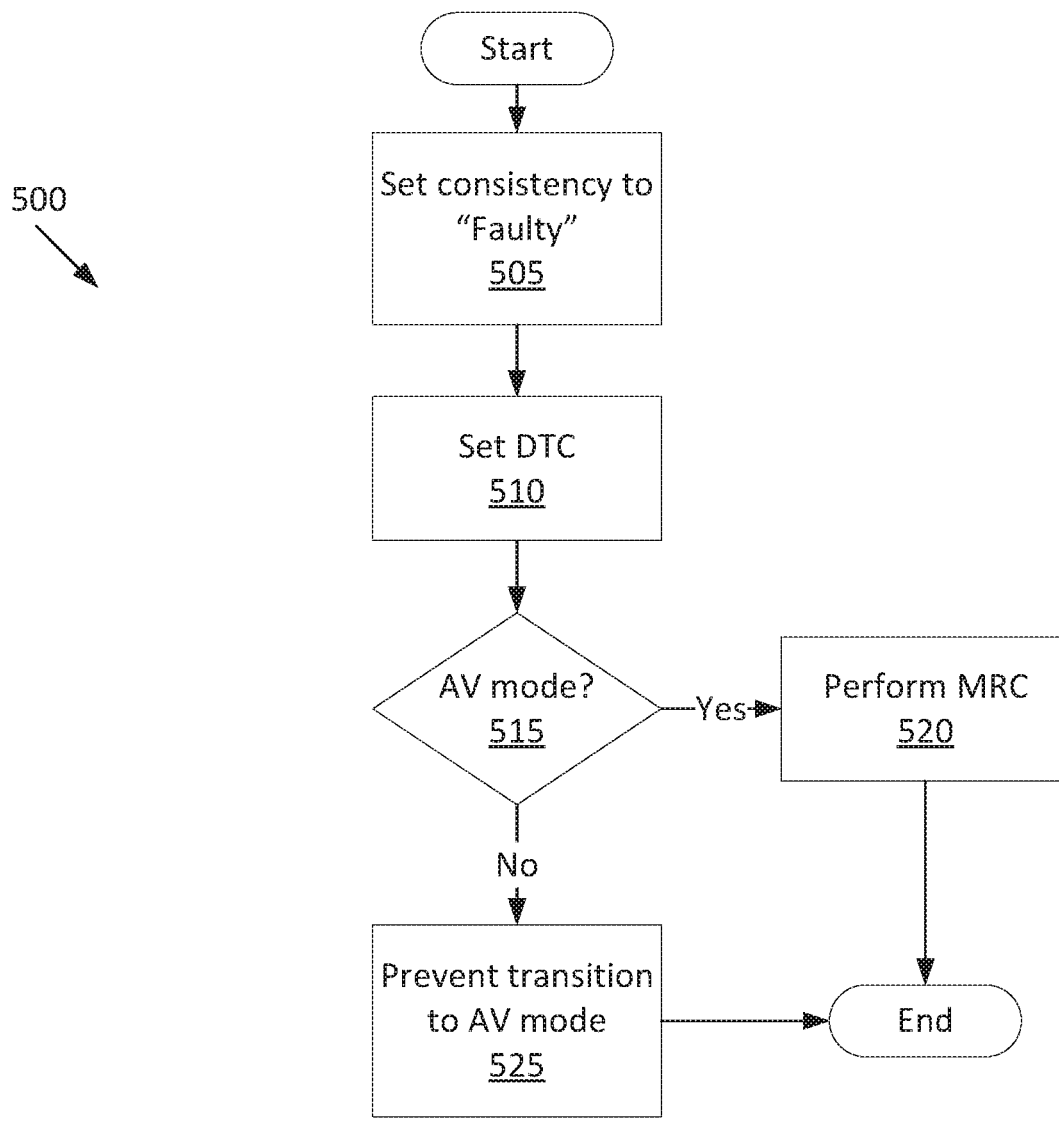
FIG. 5 is a process flow diagram of an example process for responding to inconsistency hardware or software for the vehicle of FIG. 1.

FIG. 5 is a process flow diagram of the process 500 for fault-mode management to, e.g., inconsistent hardware, software, or configuration for the vehicle 32. The memory of the computer 30 stores executable instructions for performing the steps of the process 500. The process 500 may be triggered by a communication issue in the process 300, an inconsistency in a hardware identifier or configuration identifier in the process 200, or an inconsistency in a software identifier that affects autonomous operation in the process 600. As a general overview of the process 500, the computer 30 sets a consistency status to "Faulty," sets a diagnostic trouble code, performs a minimal risk condition if the vehicle 32 is in an autonomous mode, and prevents a transition to the autonomous mode if the vehicle 32 is not in an autonomous mode.

The process 500 begins in a block 505, in which the computer 30 sets a consistency status to a faulty status, e.g., "Faulty," i.e., a setting indicating an inconsistency in the identifiers. The consistency status may be transmitted to the various ECUs 44, whose programming may take the consistency status into account.

Next, in a block 510, the computer 30 sets a diagnostic trouble code. The diagnostic trouble code may be read by a technician servicing the vehicle 32, e.g., via onboard diagnostics such as OBD-II. The diagnostic trouble code may specify the reason that the process 500 was invoked, e.g., internal message not received, lack of contact with the remote server 74, identifier mismatch between the local set of identifiers and the remotely served set of identifiers, etc.

Next, in a decision block 515, the computer 30 determines whether the vehicle computer 34 is in an autonomous mode, i.e., autonomous or semi-autonomous operation. If the vehicle 32 is not in an autonomous mode, the process 500 proceeds to a block 525.

If the vehicle 32 is in an autonomous mode, next, in a block 520, the computer 30 instructs the vehicle 32 to perform a minimal risk condition, e.g., instructs the vehicle computer 34 to perform the minimal risk condition by controlling the propulsion 36, brake system 38, and steering 40. For purposes of this disclosure, "minimal risk condition" has the meaning accorded by the National Highway Traffic Safety Administration (NHTSA) and the Society of Automotive Engineers (SAE): "'Minimal risk condition' means low-risk operating condition that an automated driving system automatically resorts to either when a system fails or when the human driver fails to respond appropriately to a request to take over the dynamic driving task." (U.S. Dept. of Transportation & NHTSA, *Automated Driving Systems 2.0: A Vision for Safety*, at 26 (citing SAE International J3016, International Taxonomy and Definitions for Terms Related to Driving Automation Systems for On-Road Motor Vehicles (J3016:September2016)).) For example, the minimal risk condition may be initiating a handover to the human driver; autonomously driving the vehicle 32 to a halt at a roadside, i.e., stopping the vehicle 32 outside active lanes of traffic; or driving the vehicle 32 to a designated location, e.g., a repair facility. The vehicle computer 34 may perform the minimal risk condition by using known autonomous-operation algorithms. After the block 520, the process 500 ends.

After the decision block 515, if the vehicle 32 is not in an autonomous mode, in a block 525, the computer 30 prevents the vehicle 32 from entering any autonomous mode. For example, the computer 30 may disregard commands from an occupant or from the remote server 74 to enter an autonomous mode. After the block 525, the process 500 ends.

Figure 6:
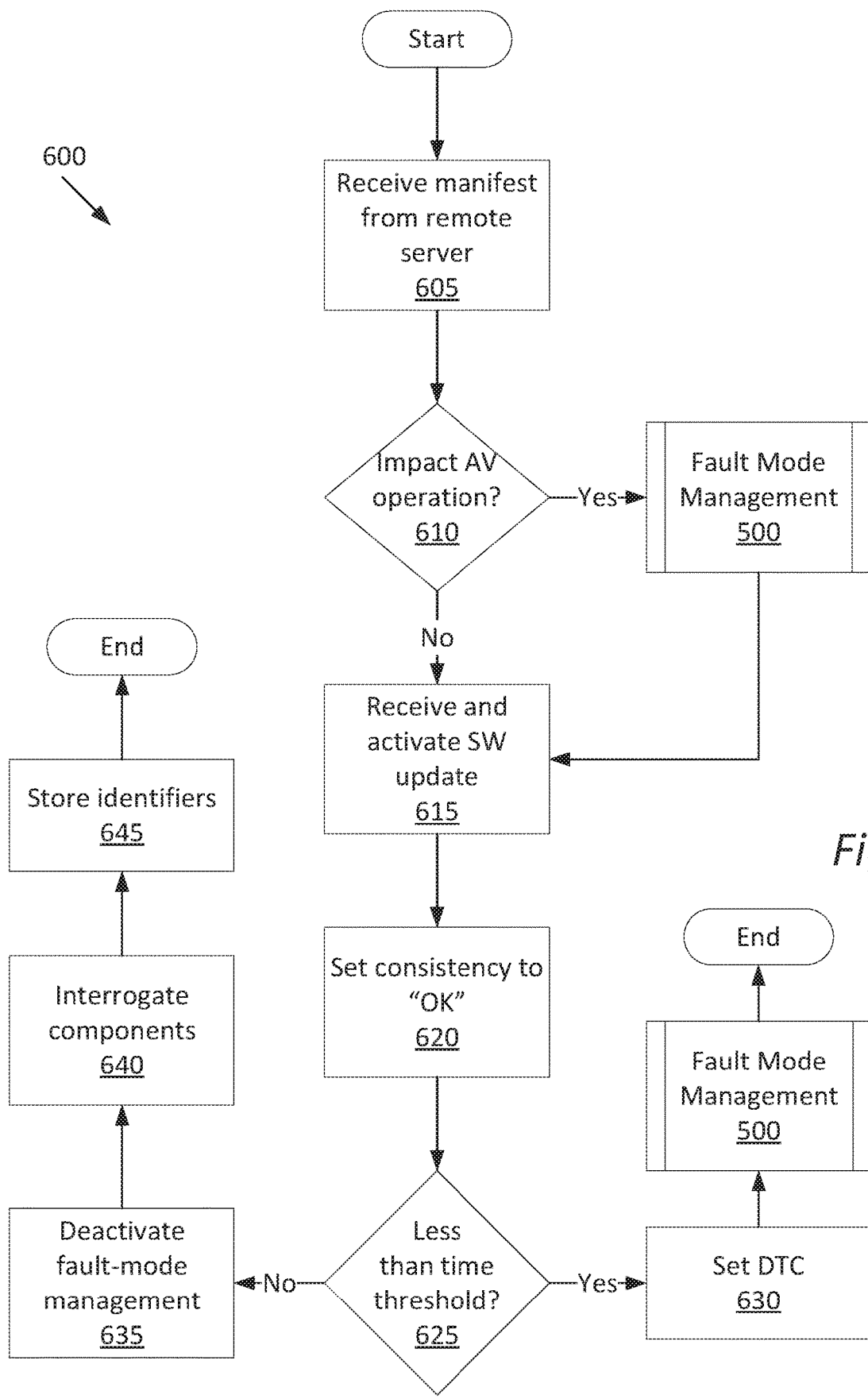
FIG. 6 is a process flow diagram of an example process for updating software for the vehicle of FIG. 1.

FIG. 6 is a process flow diagram of the process 600 for updating software for the vehicle 32. The memory of the computer 30 stores executable instructions for performing the steps of the process 600. As a general overview of the process 600, the computer 30 performs the process 500 if the software mismatch impacts autonomous operation, updates the software, resets the vehicle 32 for normal operation, and checks and stores the identifiers.

The process 600 begins in a block 605, in which the computer 30 receives a manifest from the remote server 74. The manifest lists which software or configurations, if any, are out of date or otherwise incompatible.

Next, in a decision block 610, the computer 30 determines whether the mismatched software contributes to autonomous operation of the vehicle 32. The memory of the computer 30 may store a list or table of pieces of software used during autonomous operation, and the computer 30 may check whether the software listed in the manifest is present in the stored list or table. If the software does impact autonomous operation, the process 600 next performs the process 500 for fault-mode management, and once the process 500 is complete, proceeds to a block 615.

After the decision block 610 if the software does not impact autonomous operation, or after the process 500 if the software does impact autonomous operation, the process 600 proceeds to the block 615. In the block 615, the computer 30 receives a software update from the remote server 74 and activates that software update. In other words, the computer 30 installs the software update and removes any software being replaced by the software update.

Next, in a block 620, the computer 30 sets the consistency status to an acceptable status, e.g., "OK," i.e., a setting indicating no problems with the identifiers. The consistency status may be transmitted to the various ECUs 44, whose programming may take the consistency status into account. During the process 500, the consistency status would have been set to "Faulty."

Next, in a decision block 625, the computer 30 determines whether the consistency status switched from the faulty status to the acceptable status in less than a time threshold. The time threshold may be chosen to be slightly less, e.g., 10 percent less, than the amount of time to receive and activate the software update; thus, the consistency status switching from the faulty status to the acceptable status faster than the time threshold indicates that a glitch has occurred. A glitch means that an incorrect value is stored through some mechanism other than the intended operation of executable instructions; for example, a glitch can be caused by an inadvertent bit flip, cyberattack, etc. If the consistency status switched from the faulty status to the acceptable status in more than the time threshold, the process 600 proceeds to a block 635.

If the consistency status switched from the faulty status to the acceptable status in less than the time threshold, next, in a block 630, the computer 30 sets a diagnostic trouble code indicating a glitch in the consistency status. After the block 630, the process 600 next performs the process 500 for fault-mode management. After performing the process 500, the process 600 ends.

Next, or after the decision block 625 if the consistency status switched from the faulty status to the acceptable status in more than the time threshold, the process 600 proceeds to the block 635. In the block 635, the computer 30 deactivates the fault-mode-management operations implemented during the process 500, namely, permits the vehicle 32 to exit the minimal risk condition and permits the vehicle 32 to enter an autonomous mode.

Next, in a block 640, the computer 30 requests the identifiers from components of the vehicle 32. The ECG 46 transmits requests through the communications network 42 to the components such as the ECUs 44, which respond with their software identifiers, hardware identifiers, and/or configuration identifiers.

Next, in a block 645, the computer 30 stores the returned identifiers in the local set of identifiers. The local set of identifiers is stored in the memory of the computer 30, i.e., onboard the vehicle 32. After the block 645, the process 600 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. "Substantially" as used herein means that a dimension, time duration, shape, or other adjective may vary slightly from what is described due to physical imperfections, power interruptions, variations in machining or other manufacturing, etc. The adjectives "first" and "second" are used throughout this document as identifiers and are not intended to signify importance or order. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor, and a memory storing instructions executable by the processor to:
   upon determining that a local set of identifiers is inconsistent with a remotely served set of identifiers, prevent a vehicle from entering an autonomous mode or instruct the vehicle to perform a minimal risk condition;
   wherein each identifier corresponds to and is substantially unique to a component of the vehicle.

2. The computer of claim 1, wherein the instructions further include to:
   upon determining that the local set of identifiers is inconsistent with the remotely served set of identifiers, receive a software update from a remote server.

3. The computer of claim 2, wherein the instructions further include to:
   upon receiving the software update, set a consistency status from a faulty status to an acceptable status; and
   set a diagnostic trouble code in response to the consistency status switching from the faulty status to the acceptable status in less than a time threshold.

4. The computer of claim 1, wherein the identifiers include configuration identifiers.

5. The computer of claim 1, wherein the instructions further include to:
   periodically request the identifiers from the vehicle components; and
   store the returned identifiers in the local set of identifiers.

6. The computer of claim 1, wherein the local set of identifiers is a current local set of identifiers, and the instructions further include to:

upon determining that the current local set of identifiers is inconsistent with a previous local set of identifiers, transmit the current local set of identifiers to a remote server serving the remotely served set of identifiers.

7. The computer of claim 1, wherein performing the minimal risk condition includes driving the vehicle to a designated location.

8. The computer of claim 1, wherein the local set of identifiers is stored in a memory onboard the vehicle.

9. The computer of claim 1, wherein the remotely served set of identifiers is stored in a memory remote from the vehicle.

10. The computer of claim 1, wherein the instructions further include to:
determine that the local set of identifiers is inconsistent with the remotely served set of identifiers by determining that at least one identifier in the local set of identifiers is different than a respective identifier in the remotely served set of identifiers.

11. A method comprising:
upon determining that a local set of identifiers is inconsistent with a remotely served set of identifiers, preventing a vehicle from entering an autonomous mode, or instructing the vehicle to perform a minimal risk condition;
wherein each identifier corresponds to and is substantially unique to a component of the vehicle.

12. The method of claim 11, further comprising, upon determining that the local set of identifiers is inconsistent with the remotely served set of identifiers, receiving a software update from a remote server.

13. The method of claim 12, further comprising:
upon receiving the software update, setting a consistency status from a faulty status to an acceptable status; and
setting a diagnostic trouble code in response to the consistency status switching from the faulty status to the acceptable status in less than a time threshold.

14. The method of claim 11, wherein the identifiers include configuration identifiers.

15. The method of claim 11, further comprising:
periodically requesting the identifiers from the vehicle components; and
storing the returned identifiers in the local set of identifiers.

16. The method of claim 11, wherein the local set of identifiers is a current local set of identifiers, the method further comprising:
upon determining that the current local set of identifiers is inconsistent with a previous local set of identifiers, transmitting the current local set of identifiers to a remote server serving the remotely served set of identifiers.

17. The method of claim 11, wherein performing the minimal risk condition includes driving the vehicle to a designated location.

18. The method of claim 11, wherein the local set of identifiers is stored in a memory onboard the vehicle.

19. The method of claim 11, wherein the remotely served set of identifiers is stored in a memory remote from the vehicle.

20. The method of claim 11, further comprising determining that the local set of identifiers is inconsistent with the remotely served set of identifiers by determining that at least one identifier in the local set of identifiers is different than a respective identifier in the remotely served set of identifiers.

* * * * *